US010933848B2

United States Patent
Bast et al.

(10) Patent No.: US 10,933,848 B2
(45) Date of Patent: Mar. 2, 2021

(54) TECHNIQUE FOR DETERMINING THE POSITION OF A SUPPORT POINT OF A PARKING BRAKE UNIT

(71) Applicant: LUCAS AUTOMOTIVE GMBH, Koblenz (DE)

(72) Inventors: Michael Bast, Bendorf (DE); Benedikt Ohlig, Vallendar (DE); Matthias Fuchs, Koblenz (DE); Erwin Michels, Kail (DE)

(73) Assignee: ZF Active Safety GmbH, Koblenz (DE)

( * ) Notice: Subject to any disclaimer, the term of this patent is extended or adjusted under 35 U.S.C. 154(b) by 0 days.

(21) Appl. No.: 16/330,480

(22) PCT Filed: Aug. 1, 2017

(86) PCT No.: PCT/EP2017/069394
§ 371 (c)(1),
(2) Date: Mar. 5, 2019

(87) PCT Pub. No.: WO2018/046188
PCT Pub. Date: Mar. 15, 2018

(65) Prior Publication Data
US 2019/0225198 A1  Jul. 25, 2019

(30) Foreign Application Priority Data

Sep. 8, 2016 (DE) ..................... 10 2016 010 823.1

(51) Int. Cl.
*B60T 8/17* (2006.01)
*B60T 13/58* (2006.01)
(Continued)

(52) U.S. Cl.
CPC .......... *B60T 8/1725* (2013.01); *B60T 13/588* (2013.01); *B60T 13/667* (2013.01); *B60T 13/741* (2013.01);
(Continued)

(58) Field of Classification Search
CPC ............... F16D 2123/00; F16D 66/021; F16D 2121/24; F16D 2121/04; B60T 13/588;
(Continued)

(56) References Cited

U.S. PATENT DOCUMENTS 4,944,372 A * 7/1990 Taig ...................... B60T 13/741
188/156
6,238,011 B1 5/2001 Heckmann
(Continued)

FOREIGN PATENT DOCUMENTS

DE 19730094 A1 1/1999
DE 19732168 C1 1/1999
(Continued)

*Primary Examiner* — Thomas J Williams
*Assistant Examiner* — James K Hsiao
(74) *Attorney, Agent, or Firm* — Robert Harwood James

(57) ABSTRACT

A method for operating a vehicle brake, wherein the vehicle brake comprises a service brake having an actuating piston, which can be moved into an actuation position in order to produce a braking force by the action of a hydraulic pressure, and wherein the vehicle brake also comprises a parking brake unit, which is designed to move over a first motion range without producing a braking force and is also designed to move over a second motion range, in which the parking brake unit is supported against the actuating piston and a braking force is thus changed, wherein the first and second motion ranges transition into each other at a support point, wherein the method is performed in the pressureless state or at a hydraulic pressure below a predefined threshold value and comprises the following steps: a) moving the parking brake unit from the first into the second motion range or vice (Continued)

versa; b) recording the curve of an operating parameter of the parking brake unit during step a); and c) determining the position of the support point on the basis of the curve of the operating parameter.

13 Claims, 6 Drawing Sheets

(51) Int. Cl.
| | |
|---|---|
| *F16D 66/02* | (2006.01) |
| *B60T 8/172* | (2006.01) |
| *B60T 13/74* | (2006.01) |
| *F16D 65/18* | (2006.01) |
| *B60T 13/66* | (2006.01) |
| *B60T 15/04* | (2006.01) |
| *F16D 121/04* | (2012.01) |
| *F16D 121/24* | (2012.01) |
| *F16D 123/00* | (2012.01) |

(52) U.S. Cl.
CPC ............ *B60T 15/043* (2013.01); *F16D 65/18* (2013.01); *F16D 66/021* (2013.01); *F16D 2121/04* (2013.01); *F16D 2121/24* (2013.01); *F16D 2123/00* (2013.01)

(58) Field of Classification Search
CPC .... B60T 13/741; B60T 8/1725; B60T 13/667; B60T 13/043
See application file for complete search history.

(56) References Cited

U.S. PATENT DOCUMENTS

| | | | |
|---|---|---|---|
| 6,394,235 B1 | 5/2002 | Poertzgen et al. | |
| 6,536,562 B1 | 3/2003 | Böhm et al. | |
| 7,424,937 B2* | 9/2008 | Henry | B60T 13/741 |
| | | | 188/156 |
| 7,744,166 B2 | 6/2010 | Leiter et al. | |
| 7,992,691 B2 | 8/2011 | Maron et al. | |
| 10,351,119 B2 | 7/2019 | Wolff et al. | |
| 2006/0267402 A1* | 11/2006 | Leiter | B60T 7/107 |
| | | | 303/20 |
| 2007/0158148 A1* | 7/2007 | Ohtani | F16D 65/18 |
| | | | 188/158 |
| 2011/0240418 A1 | 10/2011 | Tachiiri | |
| 2014/0202801 A1 | 7/2014 | Berger et al. | |
| 2017/0297548 A1 | 10/2017 | Baehrle-Miller et al. | |

FOREIGN PATENT DOCUMENTS

| | | |
|---|---|---|
| DE | 19826053 A1 | 12/1999 |
| DE | 10150803 A1 | 5/2003 |
| DE | 102004004992 A1 | 9/2005 |
| DE | 102008052845 A1 | 5/2009 |
| DE | 102011006457 A1 | 11/2011 |
| DE | 102013008673 A1 | 4/2014 |
| DE | 102014220252 A1 | 4/2016 |
| DE | 102016208583 A1 | 11/2016 |
| JP | 2006153074 A | 6/2006 |

* cited by examiner

TECHNIQUE FOR DETERMINING THE POSITION OF A SUPPORT POINT OF A PARKING BRAKE UNIT

CROSS-REFERENCE TO RELATED APPLICATIONS

This application is a national stage of international Application No. PCT/EP2017/069394, filed 1 Aug. 2017, the disclosures of which are incorporated herein by reference in entirety, and which claimed priority to German Patent Application No. 10 2016 010 823.1, filed 8 Sep. 2016, the disclosures of which are incorporated herein by reference in entirety.

BACKGROUND TO THE INVENTION

The present disclosure relates generally to the technical field of vehicle brakes and in particular to vehicle brakes with a parking brake unit. More precisely, the present disclosure relates to a method for operating a vehicle brake, in which a parking brake unit can rest on a hydraulically actuatable actuating piston to vary a brake force, wherein the support takes place after a support point is reached. The position of this support point can be determined by means of the present method. The present disclosure further relates to a vehicle brake with a control unit for executing such a method as well as a computer program product and a control unit for this.

Vehicle brakes which comprise both a hydraulically actuatable service brake and a parking brake unit are known and are already used in vehicles in many cases. The service brake comprises an actuating piston, which is movable under the influence of a hydraulic pressure and when assuming an actuating position typically rests on a friction lining and presses this against a rotor of the vehicle brake, such as a brake disc, for example. The hydraulic pressure can be built up under driver control, for example according to a pedal actuation. It is further known to build up the hydraulic pressure at least partially by means of additional electrohydraulic components independently of the driver or to amplify a pressure generated under driver control.

It is likewise known to provide, in addition to the service brake, parking brake units, which are to provide lasting brake forces, in particular when the vehicle assumes a stationary state, at least temporarily (parking state, hill start etc.). To this end the parking brake unit can generally be configured to hold the actuating piston, even after dissipation of the hydraulic pressure, in a position generating brake force and to lock it preferably mechanically. Examples of such solutions are to be found in DE 101 50 803 B4 and DE 10 2004 004992 A1.

Finally, it is known that in the case of such vehicle brakes in the unactuated state, a predetermined clearance is to be maintained between the brake disc and the friction lining, in order to avoid so-called residual grinding torques. At the same time, however, the clearance may not turn out to be arbitrarily high, in order to avoid actuating delays. A discussion of this problem is to be found in WO 2011/091985 A1.

To move the parking brake unit, precise control instructions are necessary to achieve the desired degree of brake forces on activation as well as a desired clearance following release of the parking brake unit. It has turned out that this is not always possible with the known solutions.

SUMMARY OF THE INVENTION

There is to be specified a method for operating a vehicle brake, and a vehicle brake, which permit precise control of a parking brake unit.

According to the method for operating a vehicle brake, the vehicle brake comprises a service brake with an actuating piston, which is movable into an actuating position for generating a brake force under the influence of a hydraulic pressure, and the vehicle brake further comprises a parking brake unit, which is configured to move over a first movement range without generating a brake force, and which is further configured to move over a second movement range in which it rests against the actuating piston under variation of a brake force, wherein the first and second movement ranges merge into each other at a support point. The method is carried out in a pressureless state or at a hydraulic pressure below a predetermined threshold value and comprises the following steps:

a) moving the parking brake unit from the first to the second movement range or vice versa;

b) detecting a course of an operating parameter of the parking brake unit during step a);

c) determining a position of a support point based on the course of the operating parameter.

The service brake and the parking brake unit can be configured according to generally known principles, at least in a mechanical respect. In particular, as explained below, a mechanical or an electromechanical parking brake unit can be involved. Movement of the parking brake unit can further be understood as movement of the unit as such or, however, only the movement of individual components and/or modules of the parking brake unit, while other components or modules can be configured to be generally fixed. For example, the parking brake unit can comprise elements fixedly coupled to a housing of the vehicle brake, as well as elements movable relative thereto, which can move over said movement ranges.

The parking brake unit can further rest even in the first movement range on the actuating piston, without generating brake forces hereby, however. For example, the parking brake unit can be moved together with the actuating piston over the first movement range, in particular by control of the parking brake unit itself, in order eventually to arrive in the second movement range, in which the actuating piston rests on any friction lining and brake forces are generated. Varying of the brake force can relate in this case to first generating a brake force (thus an increase starting out from 0 N) or increasing or reducing brake forces already generated by means of the service brake.

The movement over the first movement range can generally take place in the millimetre range, for example 0.5 mm to 30 mm. The movement over the second movement range, on the other hand, can be much smaller, as in this case substantially only elastic deformations of, for example, the friction linings are produced. Figuratively speaking, the first movement range can accordingly relate to the required movement, by means of which (at least in the state of the service brake devoid of hydraulic pressure) all clearances and gap dimensions within the vehicle brake are bridged and any friction lining is brought into abutment with a brake disc for the first time by movement of the parking brake unit. This state can be described accordingly as "support point" (or also "setpoint"). Any further movement of the parking brake unit starting out from the support point into the second movement range leads accordingly to pressing of the friction lining onto the brake disc and thus the variation or production of a brake force.

To achieve the pressureless state or a hydraulic pressure below the predetermined threshold value, the method can further comprise a step of the at least partial reduction of hydraulic pressure, for example by draining hydraulic fluid from the vehicle brake. On attaining the desired hydraulic pressure (0 bar or below the threshold value), the parking brake unit can be moved according to step a). In this state the actuating piston can generally also be arranged in a position different from the actuating position in which it generates no brake forces or only slight brake forces. The predetermined threshold value can further correspond to a minimum hydraulic pressure, which is required to move the actuating piston into its actuating position. This means that it can be ensured according to this variant that the method is carried out in a state in which no brake forces generated hydraulically by means of the service brake are present. Likewise the threshold value cannot be more than half of a maximally adjustable hydraulic pressure and preferably not more than a quarter of the maximally adjustable hydraulic pressure. This also guarantees implementation of the method with reduced hydraulically generated brake forces or the complete absence of these.

As explained above, there can also take place in step a) a joint movement of parking brake unit and actuating piston, in which the parking brake unit rests on the actuating piston and moves this over the first movement range. As soon as the actuating piston reaches a brake-force-active actuating position for the first time hereby and rests in a generally known manner on any friction lining of the vehicle brake, the support point of the parking brake unit is typically also reached. Any further movement of the parking brake unit into the second movement range consequently leads to a variation or production of brake forces. The same applies to the reverse movement from the second to the first movement range, in which after reaching the support point the actuating piston can ultimately be moved out of its actuating position and any brake forces can be reduced significantly or entirely dissipated. This "release" or "lifting" of the actuating piston can be monitored on the basis of the interaction of parking brake unit and actuating piston, which interaction is maintained at least up to the support point, likewise by means of the course of an operating parameter of the parking brake unit and thus the position of the support point can be determined.

The method steps can be executed or at least initiated in their own right or in their totality by a controller of the vehicle brake, which can be provided in particular in the form of an electronic control unit. This can also be integrated in a generally known manner into a central control unit of the vehicle or be connectable to this. The detection of the course of the operating parameter of the parking brake unit can further take place with the aid of suitable detection devices, such as, for example, devices for monitoring a drive moving the parking brake unit. Determination of the position of the support point by means of the course of the operating parameter can further take place with determination of falling below and/or exceeding predetermined threshold values or the determination of other characteristic variables of this course.

The method can further comprise storing the determined position of the support point in a controller of the vehicle brake. The determined position of the support point can be taken into account in a release of the parking brake unit or other processes.

The controller of the vehicle brake can be an electronic control unit according to the above implementations. Furthermore, taking account of the position of the support point in a release of the parking brake unit can include generating control instructions for releasing the parking brake unit with the aid of the position of the support point. For example, the parking brake unit can be moved according to or relative to the determined position of the support point to achieve a release. In other words, the determined position of the support point can be stored in the sense of a starting or 0 reference and the further movements of the parking brake unit can be defined and specified with regard to this reference.

It can further be provided here that the position of the support point is initially determined once according to the above method and following storage in the controller is taken into account for several release processes of the parking brake unit. In other words, the determined position of the support point can be stored as a reference or base value in the controller in order to refer to it in any number of subsequent release processes. As explained below, it can likewise be provided to update the information stored in the controller at certain intervals, wherein this information can then be taken as a basis in following release processes of the parking brake unit.

In this context a development provides that the release of the parking brake unit includes moving the parking brake unit from the second actuating range at least up to the support point. In other words, it is to be ensured that the release takes place at least up to the point at which no further variations of the brake force originate from the parking brake unit and if applicable the brake force is completely dissipated.

The release of the parking brake unit can likewise include moving the parking brake unit beyond the support point into the first movement range. The parking brake unit can accordingly be moved deliberately by a certain extent into the first movement range. A variation or generation of brake forces by the parking brake unit can reliably be prevented by this.

In particular, the movement into the first movement range can take place to set a brake clearance. As explained above, the clearance relates in particular to the desired gap or distance between any friction lining of the vehicle brake and the brake disc. At the latest after reaching the support point in an application movement of the parking brake unit from the first to the second movement range, the brake clearance is completely bridged and in this state therefore reduced to zero. The release of the parking brake unit can accordingly take place according to or taking account of the desired brake clearance. In other words, the release and thus movement of the parking brake unit from the second to the first movement range takes place in such a way that sufficient free space is created within the vehicle brake, so that the remaining components can move back into their starting positions to assume the desired brake clearance. These components can be the actuating piston, for example, which is to be returned from its actuating position, or any friction linings, which are to be lifted from the brake disc to generate the clearance.

In addition or alternatively, it can be provided that the movement into the first movement range takes place to set a safety distance between the parking brake unit and the actuating piston. This setting is conceivable in particular in cases in which the parking brake unit rests on a piston base of the actuating piston to generate brake forces. The support can take place, for example, by way of an actuator unit explained below, which is at least partially received in the actuating piston.

The safety distance can assume a predetermined minimum value for system safety reasons, in order to guarantee a proper service brake function in the case of non-actuation of the parking brake function. In other words, it can be ensured that the parking brake unit does not influence or obstruct a movement of the actuating piston in the context of service brake actuation. Undesirable residual grinding torques can also be generated with the assumption of an inadequate safety distance, as the actuating piston cannot return to a starting position to an adequate extent to lift any friction linings completely from the vehicle brake. On the other hand, the safety distance (e.g. in the form of a predetermined minimum value) should be kept as small as possible to guarantee a swift reaction capability of the parking brake unit in particular. The desired reduction in the safety distance can benefit from the precise position determination of the support point presented here.

The release and thus movement of the parking brake unit can consequently take place according to or taking account of the desired safety distance. In particular, the parking brake unit can be moved in this case by the desired safety distance beyond the determined support point.

In this connection it can further be provided that the movement into the first movement range takes place over a distance that is defined as a predetermined distance to the support point. The predetermined distance can likewise be stored in a controller of the vehicle brake. On release of the parking brake unit, this can be added to the determined position of the support point to determine the required movement distance of the parking brake unit from the second to the first movement range. The predetermined distance can generally be selected as a function of a desired brake clearance, as the free space described above for a return movement of the other components can be established by way of this.

The position of the support point can generally be defined as the distance of the support point to a reference point. The reference point can be a fixed region and/or a fixed component of the vehicle brake, for example, and relate in particular to the parking brake unit. It can further be provided in this context that the parking brake moves relative to the reference point. To this end the reference point can be chosen as a coupling region between parking brake unit and the other components of the vehicle brake, wherein the coupling region includes, for example, a housing region of the vehicle brake. The reference point can also be selected generally as a starting point or resting position of the parking brake unit.

A development provides that the parking brake unit comprises an electromotive drive unit and an actuator unit interacting with the actuating piston, wherein the electromotive drive unit is configured to move the actuator unit over the first and second movement range. As explained, the electromotive drive unit can form a generally fixed component of the parking brake unit here, while the actuator unit executes the movements of the parking brake unit according to one of the aspects described above. The interaction of actuator unit and actuating piston can include a direct abutment of the actuator unit on the actuating piston. According to one variant, the actuating piston is configured as a hollow piston and the actuator unit is at least partially received in the hollow piston. The actuator unit can further rest no later than on reaching the support point on a base wall or the piston base of the hollow piston.

The operating parameter of the parking brake unit can comprise a motor current of the electromotive drive unit and/or a speed of the electromotive drive unit. These parameters can be detected in a known manner via motor signals and/or sensor devices provided for this and can be supplied to a controller of the vehicle brake. The speed can further relate to a number of revolutions of the electromotive drive unit per set unit of time.

The actuator unit can further comprise a nut/spindle arrangement and the position of the support point can be defined as a function of at least one of the following parameters:

position information of the spindle nut;
path of the spindle nut;
number of revolutions of the nut/spindle arrangement.

In this variant the electromotive drive unit can drive the spindle in a rotatory manner in a generally known way to produce a translatory movement of the spindle nut. The spindle nut can be that part of the actuator unit that interacts directly with the actuating piston or can even brought into abutment with it. If reaching of the support point is determined by monitoring of an operating parameter of the parking brake unit, the position of the support point can accordingly be defined directly in the form or as a function of at least one of the aforesaid parameters. Here the position information of the spindle nut can relate to a position along a movement axis of the parking brake unit and/or of the actuator unit. The path of the spindle nut can further relate to a path distance covered by the spindle nut up to reaching the support point, for example related to a movement starting point of the spindle nut. The number of revolutions of the nut/spindle arrangement can also relate to a number of revolutions executed by the nut/spindle arrangement up to reaching the support point, in particular related to a movement starting point of the spindle nut.

According to another embodiment, the method can further comprise a repetition of steps a) to c) following fulfilment of at least one of the following criteria:

expiry of a predetermined time interval;
attainment of a predetermined driving performance of the vehicle, in particular a predetermined distance covered by the vehicle;
attainment of a predetermined operating duration of the vehicle;
attainment of a predetermined braking performance of the vehicle, in particular of a predetermined number of braking operations of the vehicle.

The predetermined time interval can refer to an absolutely elapsed time period, thus regardless of whether the vehicle was actually operated or not in this time interval. The predetermined driving performance of the vehicle can generally comprise any information that permits a conclusion to be drawn regarding the extent of driving operation and the loads on the vehicle connected to this. The predetermined operating duration of the vehicle can relate to the cumulative time in which the vehicle assumes a state ready for driving, for example the cumulative time with the ignition turned on and/or the engine running. The predetermined braking performance can be determined by estimating the brake forces generated as a whole, for example by detecting the overall reductions in speed of the vehicle carried out by braking. The number of braking instances can relate generally to the absolute number of braking processes in which brake forces are achieved.

A development provides that the method further comprises actuation of the parking brake unit for the production of a brake force independently of the driver by overcoming a brake clearance and a release of the parking brake unit to dissipate the brake force. At least one of the steps can be executed taking account of a position of the support point.

The actuation of the parking brake unit can take place here without separate activation instruction or brake actuation on the part of the driver. Instead of this, the actuation can be initiated by a controller of the vehicle brake. This can be provided in particular in an autonomous operation of the vehicle, for example in automatic processes of parking and/or exiting a parking space or in the context of driver assistance systems, which comprise a production of brake forces independently of the driver. The actuation can also take place without a parallel hydraulic pressure build-up.

Knowing the position of the support point, a movement of the parking brake unit can generally take place into the second movement range by a predetermined distance, starting out from the support point (i.e. the support point forms a starting or 0 reference), to generate brake forces. This can happen in the manner explained above by overcoming the brake clearance, which is typically bridged no later than on reaching the support point. The release of the parking brake unit can likewise be executed according to one of the previous aspects according to and/or relative to the determined position of the support point, in order to recreate the desired brake clearance.

There is further provided a vehicle brake, comprising a service brake with an actuating piston, which is movable under the influence of a hydraulic pressure into an actuating position to generate a brake force, and a parking brake unit, which is configured to move over a first movement range without generating a brake force, and which is further configured to move over a second movement range in which it rests on the actuating piston under variation of a brake force, wherein the first and second movement ranges merge into one another at a support point, and wherein the vehicle brake further comprises a control unit, which is adapted to cause the vehicle brake to implement a method with the steps according to one of the previous aspects.

To this end the vehicle brake can comprise or provide any of the aforesaid components, features and/or functions in order to realise the method according to one of the previous aspects. This relates in particular to a controller, an electromotive drive unit and/or an actuator unit as well as suitable sensor devices for determining the operating parameters of the parking brake unit.

Furthermore, a computer program product is provided, comprising program code means, in order to implement a method with the steps according to one of the previous aspects when executing the computer program product on a processor. Finally, a control unit is also provided, comprising a processor and the aforesaid computer program product.

Other advantages of this invention will become apparent to those skilled in the art from the following detailed description of the preferred embodiments, when read in light of the accompanying drawings.

DETAILED DESCRIPTION OF THE INVENTION

Figure 1:
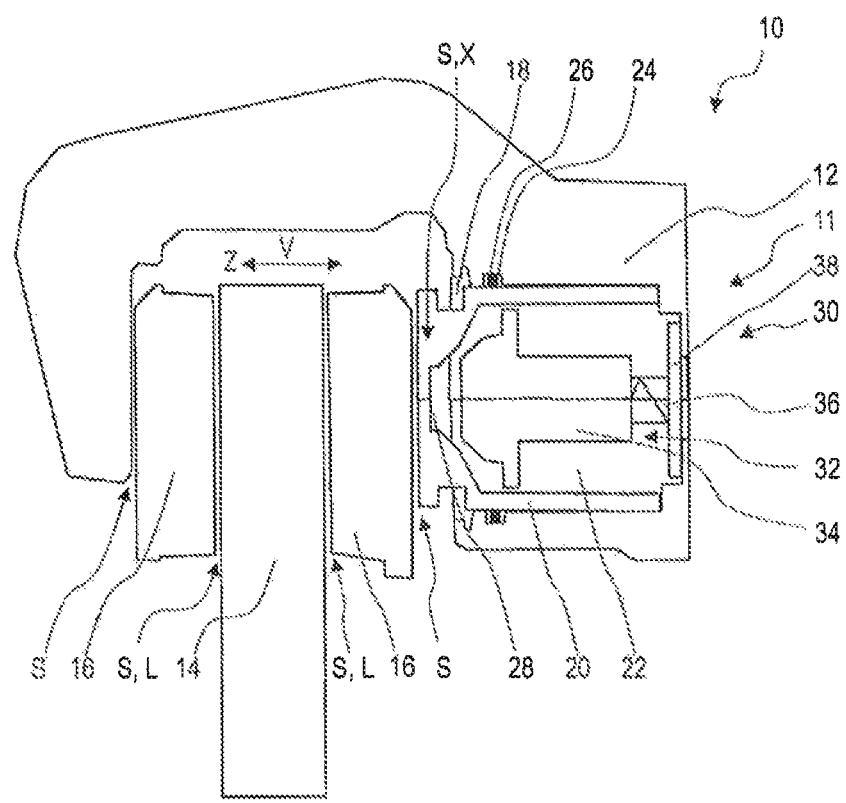
FIG. 1 is a schematic view of a vehicle brake for carrying out a method for determining the position of a support point according to a first exemplary embodiment.

In FIG. 1 there is shown a vehicle brake for implementing a method according to a first embodiment and generally designated 10. The vehicle brake 10 is configured in a mechanical respect as a generally known sliding caliper brake, wherein only selected components of the vehicle brake 10 are depicted.

The vehicle brake 10 accordingly comprises a brake housing 12 in the form of a known brake caliper and a brake disc 14 coupled non-rotatably to a vehicle wheel (not shown). Lying opposite the brake disc 14 on both sides are friction linings 16, which can be brought into abutment with the brake disc 14 to achieve a brake force. To this end a service brake 11 of the vehicle brake 10 comprises a displaceable actuating piston 20 taken up in a bore 18 in the brake housing 12. This is configured as a hollow piston and together with the bore 18 delimits a hydraulic chamber 22. By introducing and draining hydraulic fluid in the hydraulic chamber 22, a hydraulic pressure in the chamber 22 can be varied and the actuating piston can be moved in a generally known manner along a movement axis V. A movement to the left along the movement axis V in FIG. 1 corresponds here to a movement in an application direction Z. Overall the friction linings 16 for achieving a brake force can thus be brought into abutment with the brake disc 14 and on dissipation of the hydraulic pressure can be released from this again, in order to guarantee the service brake function.

To achieve the desired return movement of the actuating piston 20 into its starting position following dissipation of the hydraulic pressure, the vehicle brake 12 further comprises a schematically indicated seal 24. This is received in a groove 26 starting out from the bore 18 and abuts an external wall of the actuating piston 20. The seal 24 provides in a generally known manner a so-called "rollback" function, which acts supportively to press the actuating piston 20 back into its starting position on dissipation of the hydraulic pressure.

It is further recognised in FIG. 1 that for the parking brake function a parking brake unit 30 is taken up in the hydraulic chamber 22, which unit can likewise move along the movement axis V. The parking brake unit 30 is configured in a mechanical respect again according to known solutions and comprises an actuator unit 32, which is formed as a nut/spindle arrangement. More precisely, the actuator unit 32 comprises a spindle nut 34, which is movable by rotation of a spindle in a transiatory manner along the movement axis V. Here the spindle nut 34 can also be brought into abutment with a piston base 28, which is configured as an inner end wall region of the actuating piston 20 lying opposite the spindle nut 34 and delimiting the hydraulic chamber 22.

The actuator unit 32 is further connected to the brake housing 12 via a coupling region 38, wherein an electromotive drive or transmission unit, not shown separately, is flanged from the outside onto the brake housing 12 at the coupling region 38. The electromotive drive unit drives the spindle 36 in a rotatory manner, in order to achieve the desired displacement movement of the spindle nut 34 along the axis V.

In FIG. 1 there are also shown the gap dimensions S present in the case of non-actuation of the service brake and the parking brake function, which dimensions have to be bridged to achieve a brake force. These relate to (from left to right in FIG. 1): a gap S between the brake housing 12 and the left friction lining 16 in FIG. 1, a gap S between this left friction lining 16 and the brake disc 14, a gap S between the right friction lining 16 in FIG. 1 and the brake disc 14 and a gap S between the actuating piston 20 and the right friction lining 16. To generate brake forces, the parking brake unit 30 must additionally overcome a gap S between the spindle nut 34 and the piston base 28 of the actuating piston 20.

As discussed at the beginning, the gaps S between the friction linings 16 and the brake disc 14 are generally termed "clearance" or "brake clearance", which is why these gaps S are additionally provided with the reference sign L. The clearance L should assume a predetermined minimum value in order to avoid residual grinding torques in the sense of an undesirable abutment of the friction linings 16 on the brake disc 14 when the vehicle brake 10 is not actuated.

The gap S between the spindle nut 34 and the piston base 28 of the actuating piston 20 is a safety distance, which is why this gap S is additionally provided with the reference sign X. For system safety reasons the safety distance X assumes a predetermined minimum value in order to guarantee a proper service brake function in the case of non-actuation of the parking brake function.

In normal driver-controlled service braking, a hydraulic pressure is built up in the hydraulic chamber 22 and the actuating piston 20 is moved along the application direction Z into an actuating position generating a brake force. It comes into abutment here with the right friction lining 16, brings this into abutment with the brake disc 14 and applies the vehicle brake 10 in a known manner according to the sliding caliper design. In this process all gap dimensions S including the clearance L are bridged, with the exception of the safety distance X between the spindle nut 34 and the piston base 28. To dissipate the brake force, the actuating piston 20 moves as a consequence of reducing the hydraulic pressure and with "roll-back" support by the seal 24 opposite to the application direction Z, whereupon the gap dimensions S, L initially bridged are reinstated. The parking brake unit 30 can generally be activated in the presence or absence of a hydraulic pressure to move the actuating piston 20 into its actuation position and/or lock it there mechanically. To do this, the spindle nut 34 is moved in the manner described above along the axis V and rests in so doing (at least in a movement in the application direction Z) on the piston base 28.

For the method according to the present embodiment, it is provided that an activation of the parking brake unit 30 takes place without previous generation of a hydraulic pressure, meaning that the vehicle brake 10 is generally kept free of a hydraulic pressure. The individual method steps are explained below with reference to FIGS. 2-6.

Figure 2:
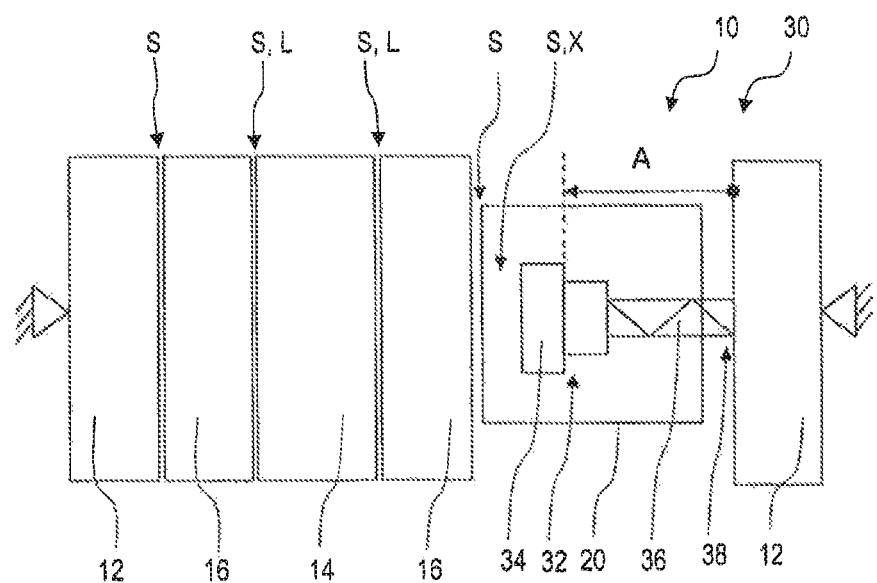
FIGS. 2-5 are schematic views for explaining the determination of the position of the support point according to the first exemplary embodiment in an application of the parking brake unit.

The vehicle brake 10 from FIG. 1 is depicted in a schematically simplified manner in FIG. 2. The brake housing 12, which is depicted as a block-shaped fixed bearing, is recognised again. The friction linings 16 and the brake disc 14, which are likewise depicted as block-shaped, are also recognised. Finally, the actuating piston 20 is also illustrated, which receives the actuator unit 32 of the parking brake unit 30. The actuator unit 32 again comprises the spindle nut 34 and spindle 36, wherein the latter is coupled to the brake housing 12 in a coupling region 38. By analogy with FIG. 1, no electromotive drive unit of the parking brake unit 30 is shown separately.

In FIG. 2 the vehicle brake 10 is again located in the generally unactuated state from FIG. 1, so that the gap dimensions S explained above including the clearance L between brake disc 14 and friction linings 16 and the safety distance X between the spindle nut 34 and the piston base 28 of the actuating piston 20 are set. The actuator unit 32 is accordingly located in a non-brake-active starting position. In this state the spindle nut 34 is spaced by a distance A from the coupling region 38 on the brake housing 12.

Figure 3:
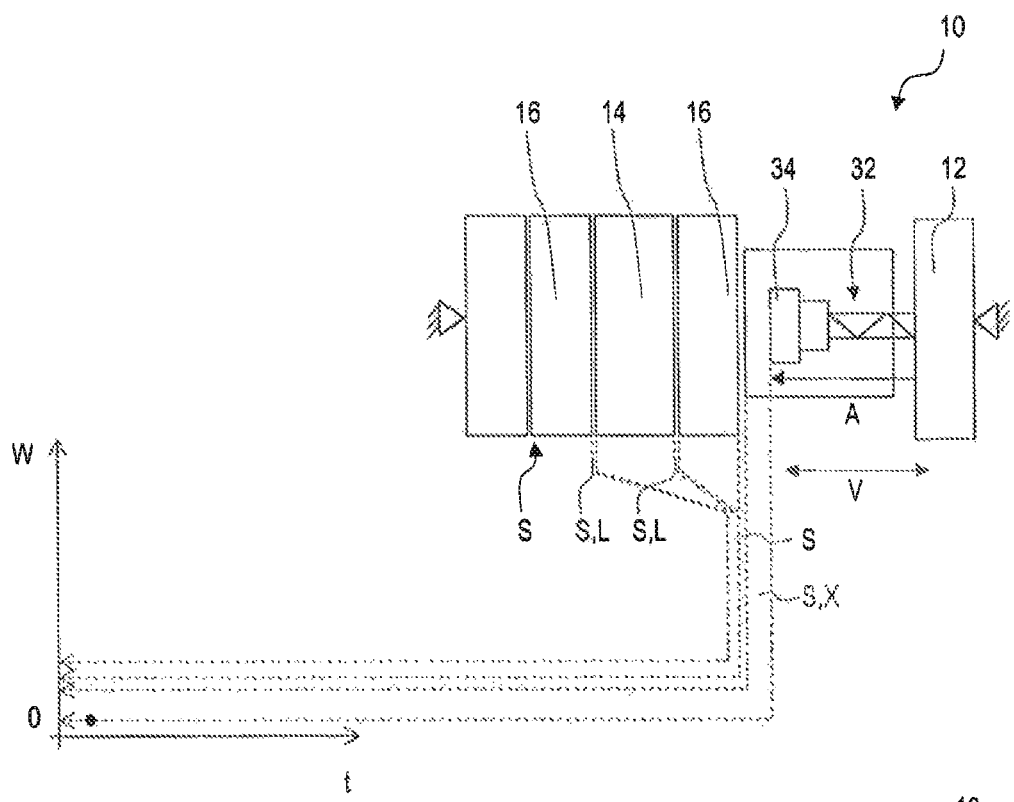
Figure 4:
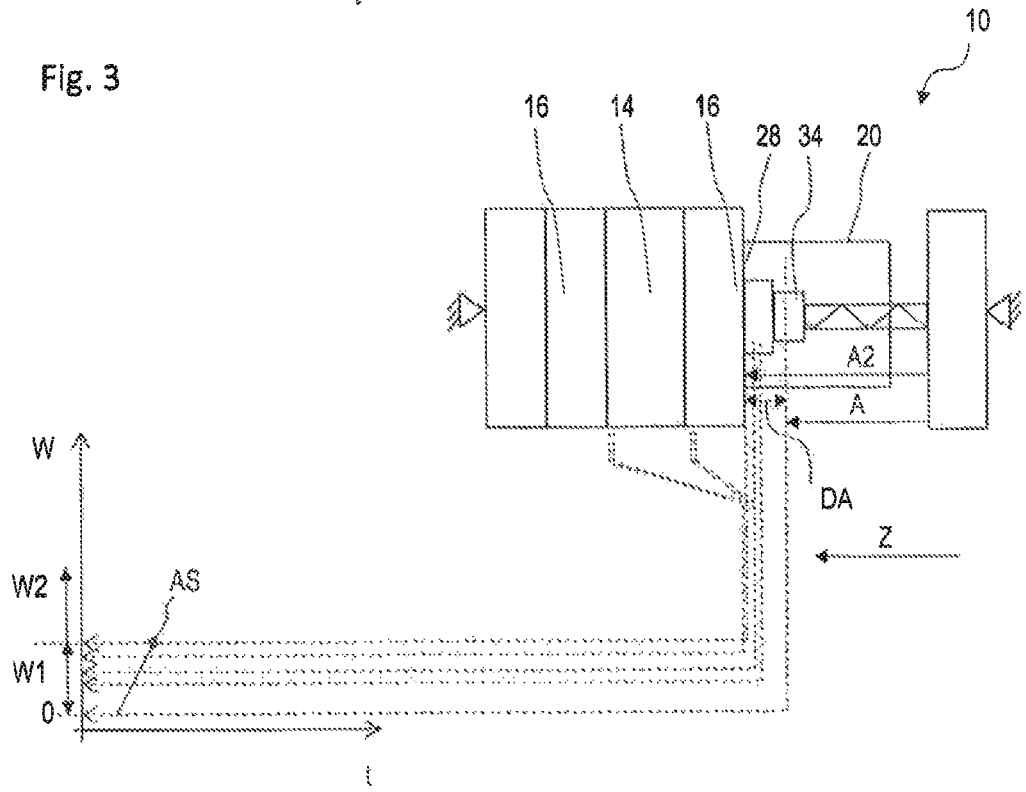

In FIGS. 3 and 4, the activation of the parking brake unit 30 and movement along a first and second movement range W1, W2 for determining the position of the support point AS is shown. The depictions of the vehicle brake 10 generally correspond to the depiction from FIG. 2. In addition, the curve of the spindle nut path W is plotted over the time t, wherein individual movement and gap dimension bridging points along the spindle nut path W are indicated by dashed lines. It is noted that for depiction purposes the starting or 0 position of the spindle nut 34 is slightly offset compared with the time axis t.

The starting state with unactuated vehicle brake 10 according to FIGS. 1 and 2 is depicted again in FIG. 3. The relevant gap dimensions S including the clearance L between the friction linings 16 and the brake disc 14 and the safety distance X between the spindle nut 34 and the piston base 28 of the actuating piston 20 are consequently recognised again. In FIG. 3 the parking brake unit 30 is located in its first movement range, in which it generates no brake forces, and the spindle nut 34 of the actuator unit 32 assumes the distance A described above to the brake housing 12. Starting out from this position, a movement takes place of the spindle nut 34 along the axis V into the position shown in FIG. 4, in which all gap dimensions S are bridged for the first time. To clarify this process, the same dashed lines are entered in FIG. 4 at the same positions as in FIG. 3.

It is recognised in detail in FIG. 4 that the spindle nut 34 has covered a spindle nut path W1 as a result of a spindle rotation and thus assumes a larger distance A2 to the brake housing 12 than is the case in FIG. 3 (see distance change DA). What is not shown separately is that in the movement between the states in FIGS. 3 and 4, the spindle nut 34 comes initially into abutment with the piston base 28 of the actuating piston 20 and moves this likewise in the direction of the brake disc 14. In other words, first the safety distance X between the spindle nut 34 and the piston base 28 is overcome, whereupon the other gap S between the actuating piston 20 and the opposing (in FIG. 3 the right) friction lining 16 is overcome. In a movement of the spindle nut 34 slightly further, all gaps S including the clearance L are finally bridged, so that the state shown in FIG. 4 is attained. The course of a motor current of the parking brake unit 30 is monitored on an ongoing base in this case as a relevant operating parameter.

Up to this state the movement of the parking brake unit 30 or of its spindle nut 34 does not generate any brake forces. In other words, the spindle nut path W1 corresponds to a first movement range of the parking brake unit 30, in which no brake forces are generated. After assumption of the state in FIG. 4, any further movement in the application direction Z running to the left in FIG. 4 leads, however, to a generation and thus variation of brake forces, as shown below in FIG. 5. This further movement of the spindle nut 34 thus takes place over a second movement range W2 of the parking brake unit 30, in which this actively generates brake forces. As a result, the state shown in FIG. 4 is thus the state of merging of the first into the second movement range of the parking brake unit 30, thus attaining the support point AS.

Figure 5:
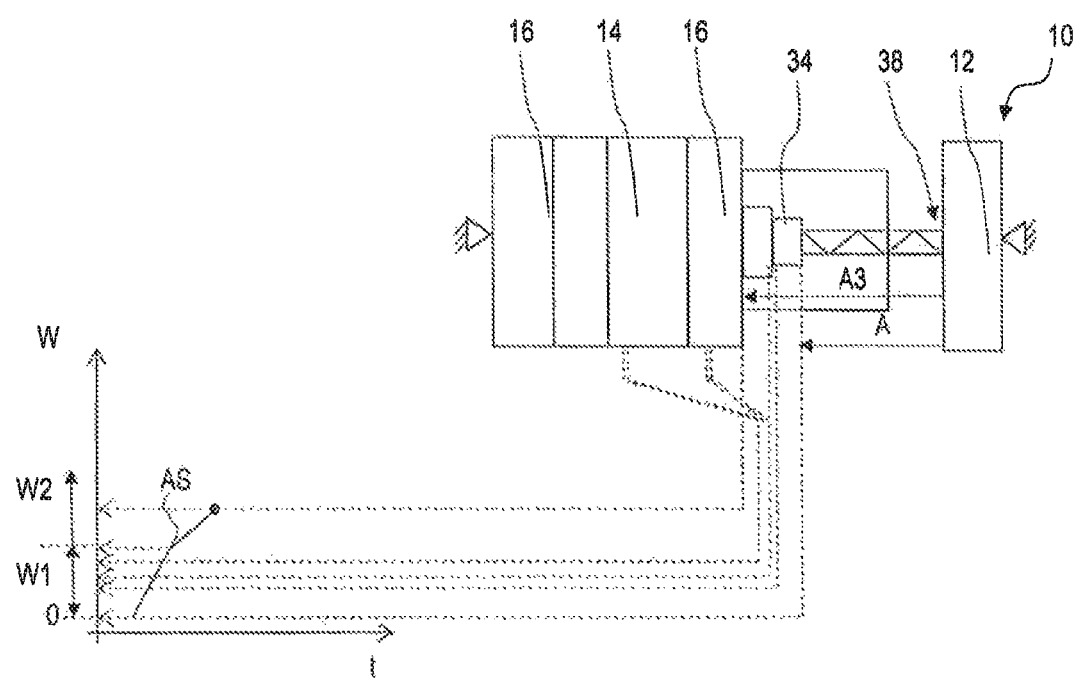

FIG. 5 shows a state in which the spindle nut 34 has been moved further into the second movement range W2 of the parking brake unit 30 and consequently presses the friction linings 16 onto the brake disc 14 with the production of corresponding brake forces. In this case the spindle nut 34 is arranged at a greater distance A3 compared with the previous figures relative to the brake housing 12. As is evident from the course of the spindle nut path W in FIG. 5, the increase in the spindle nut path W in the second movement range W2 takes place with a smaller gradient. The reason is the increasing resistances of the components of the vehicle brake 10, above all due to the elasticity or stiffness of the friction linings 16 and of the brake housing 12, against the application movement of the spindle nut 34.

This increasing resistance is reflected in a significant rise in the motor current of the parking brake unit 30 and can be recognised accordingly by a controller of the brake 10. More precisely, the attainment of the support point AS is recognised by control technology means in that the motor current of the parking brake unit 30 is substantially constant or only progresses with a slight gradient over the first movement range W1 due to the absence of brake force generation. After reaching the support point AS and a further movement into the second movement range W2, however, the motor current increases significantly and progresses with a much larger gradient. The position of the support point AS can thus be determined retrospectively, so to speak, at the latest on assumption of the state shown in FIG. 5, meaning that the support point can be determined as the point of the first significant change in the course of the motor current. A speed of the electromotive drive unit can also be evaluated in the same sense, which speed runs substantially continuously up to reaching the support point and decreases sharply in a further application movement.

In the case shown the position of the support point AS is stored as spindle nut path W or W1 in a controller, not shown, of the vehicle brake 10. It is likewise conceivable to select the brake housing 12 or the coupling region 38 as reference point and to store the position of the support point AS as corresponding distance A2 of the spindle nut 34 to the brake housing 12 (see FIG. 4). The original distance A on assumption of the starting positions of FIGS. 1 to 3 can also be chosen as reference point and the position of the support point AS defined as relative distance DA between the original distance A and the distance A2 from FIG. 4.

In all variants the controller of the vehicle brake 10 is configured to produce future control instructions for the movement of the parking brake unit 30, taking the position of the support point AS into account. For example, starting out from FIG. 2, a control instruction can be output to cause the electromotive drive unit of the parking brake unit 30 to move the spindle nut 34 over a spindle nut path W1, so that this reaches the support point AS. An additional spindle nut path W can also be specified, in order to move the spindle nut 34 into the second movement range by a predetermined extent and thereby achieve desired brake forces. In other words, the spindle nut path W to be covered as a whole is selected taking the position of the support point AS into account, so that desired brake forces can be set especially precisely.

In general the position of the support point AS can be taken into account in all control instructions for movement of the parking brake unit 30. A particularly relevant application is the release of the parking brake unit with setting of a desired brake clearance L and a desired safety distance X. This is explained below by means of FIGS. 6 and 7.

Figure 6:
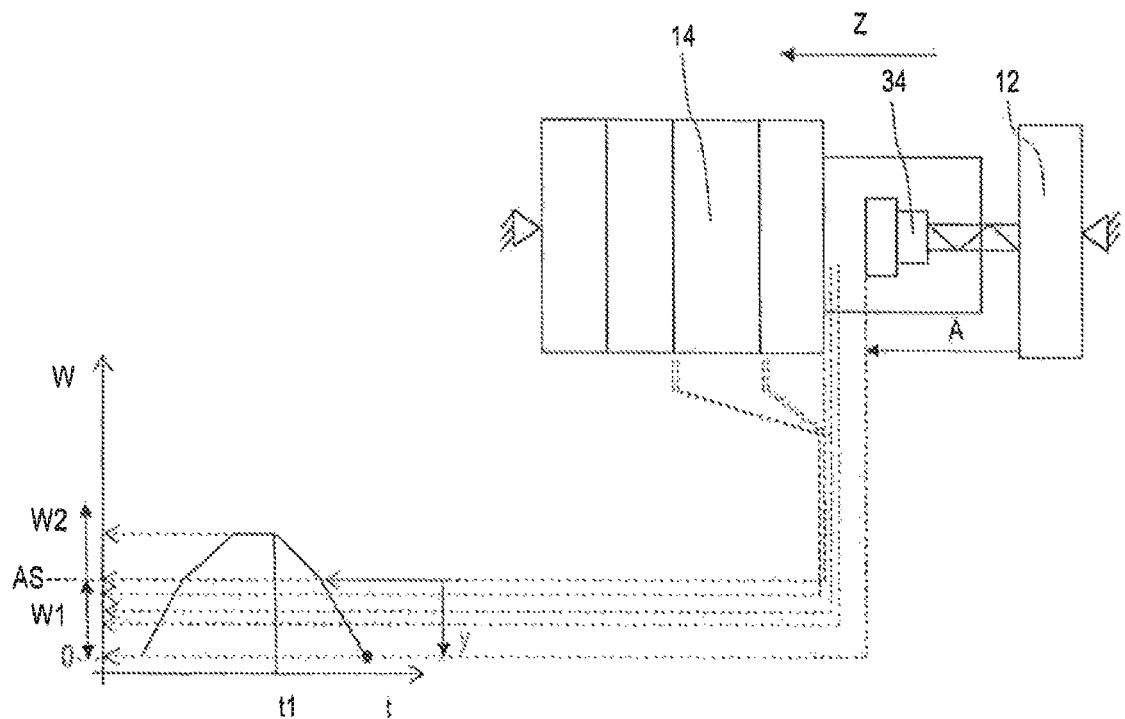
FIGS. 6-7 are schematic views for explaining the release of the parking brake unit taking account of the determined position of the support point.

In FIG. 6 it is recognised that the parking brake force set according to FIG. 5 is initially maintained up to time t1. The release of the parking brake unit 30 then begins by movement of the spindle nut 34 opposite to the application direction Z. Here the spindle nut 34 is moved initially out of the second movement range W2 as far as the support point AS and finally into the first movement range W1. In particular, a movement takes place so that the spindle nut 34 assumes its original distance A to the brake housing 12 once again. This is achieved by control technology means in that the movement of the spindle nut 34 during release of the parking brake unit 30 is controlled as a function of the determined position of the support point AS. More precisely, a predetermined distance Y to the release of the parking brake unit 30 is stored in the controller of the vehicle brake 10. After reaching the support point AS, the spindle nut 34 is moved by this distance Y further into the first movement range W1, so that the spindle nut 34 assumes a desired distance A relative to the brake housing 12 and the brake disc 14. This guarantees that the original gap dimensions S are set again, as shown in FIG. 7, and in particular a desired brake clearance L between the friction linings 16 and the brake disc 14 as well as a desired safety distance X between the spindle nut 34 and the piston base 28.

In summary, the method according to the present embodiment thus makes it possible for the position of the support point AS to be determined flexibly and in particular taken into account in a release of the parking brake unit 30, in order to generate precise control instructions for setting a desired brake clearance L and a desired safety distance X. This signifies a considerable improvement in accuracy compared with variants in which the position of the support point AS is taken as a fixed value and stored in advance in the controller, for example. For example, due to tolerances or assembly errors, the position of the support point AS can deviate from a position actually provided constructively. Controlling the movement of parking brake unit 30 solely by means of an "ideal" position of the support point AS stored in advance and/or fixed distance values A of the spindle nut 34 to the brake housing 12 can lead in particular to no adequate brake clearance L and no adequate safety distance X being set on release of the parking brake unit 30.

Figure 7:
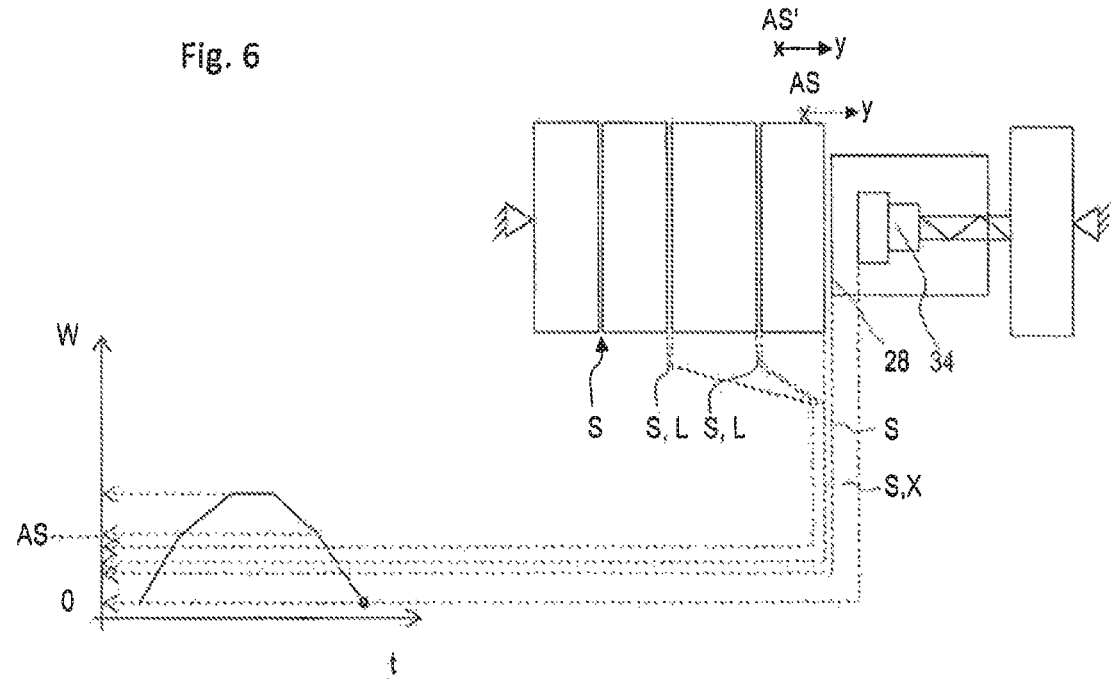

This is indicated schematically in FIG. 7. Depicted again here are the positions of the support point AS and of the distance Y, by which the spindle nut 34 is moved, starting from the support point AS, to release the parking brake unit 30. As shown, the desired brake clearance L and the desired safety distance X can be set precisely by this. If a presumed position of the support point AS' stored in advance is taken as the basis, on the other hand, which can deviate from the actual position due to the reasons stated, movement by a predetermined distance Y can lead to the spindle nut 34 being moved to an insufficient extent back into the first movement range W1. The desired gap dimensions S and in particular the brake clearance L and the desired safety distance X cannot be set or can only be set to too small an extent due to this, which can lead to significant residual grinding torques.

The method according to the present embodiment also provides for repetition of the determination of the position of the support point AS at regular intervals (e.g. after a predetermined mileage covered and/or after a predetermined number or time duration of brake operations), in particular to take account of wear of the friction linings 16. This also leads to reliable setting of the brake clearance L and of the safety distance X on release of the parking brake unit 30, as the position of the support point AS is regularly updated, so to speak.

In the embodiment described, an improvement in precision is further achieved in that the determination of the position of the support point AS takes place in the pressureless state of the service brake 11. This becomes clear from the comparison, explained below by means of FIGS. 8-11, with a similar method in which the hydraulic pressure is not reduced in advance, however. Similar features or features with the same effect are generally designated here by the same reference signs.

Figure 8:
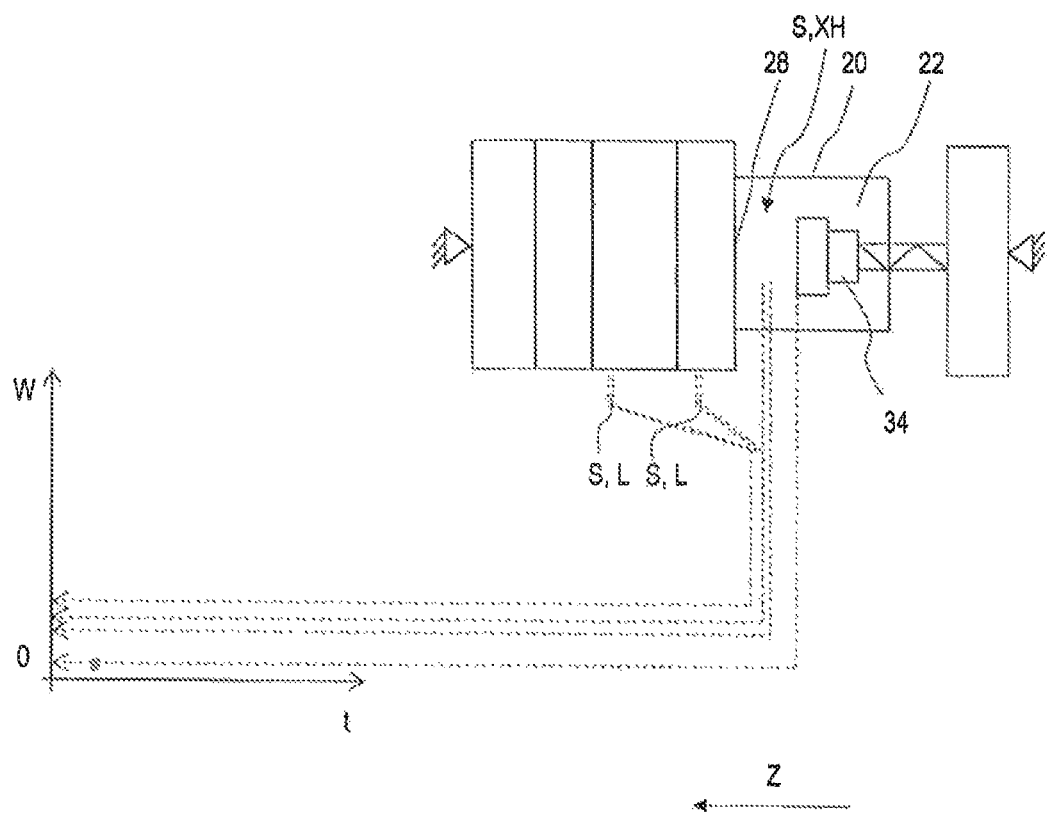
FIGS. 8-11 are schematic views for explaining a determination of the position of the support point without prior reduction of a hydraulic pressure of the service brake.

In FIG. 8, a vehicle brake 10 similar to the illustration from FIG. 2 is depicted. In this case, however, the actuating piston 20 is already moved into an actuating position due to setting of a hydraulic pressure in the hydraulic chamber 22, so that all gap dimensions S with the exception of the gap S, XH between the spindle nut 34 and the piston base 28 are already bridged. A comparison with FIG. 3 shows that, due to the hydraulic pretensioning, the gap S, XH is larger than the gap S, X in the pressureless variant.

Figure 9:
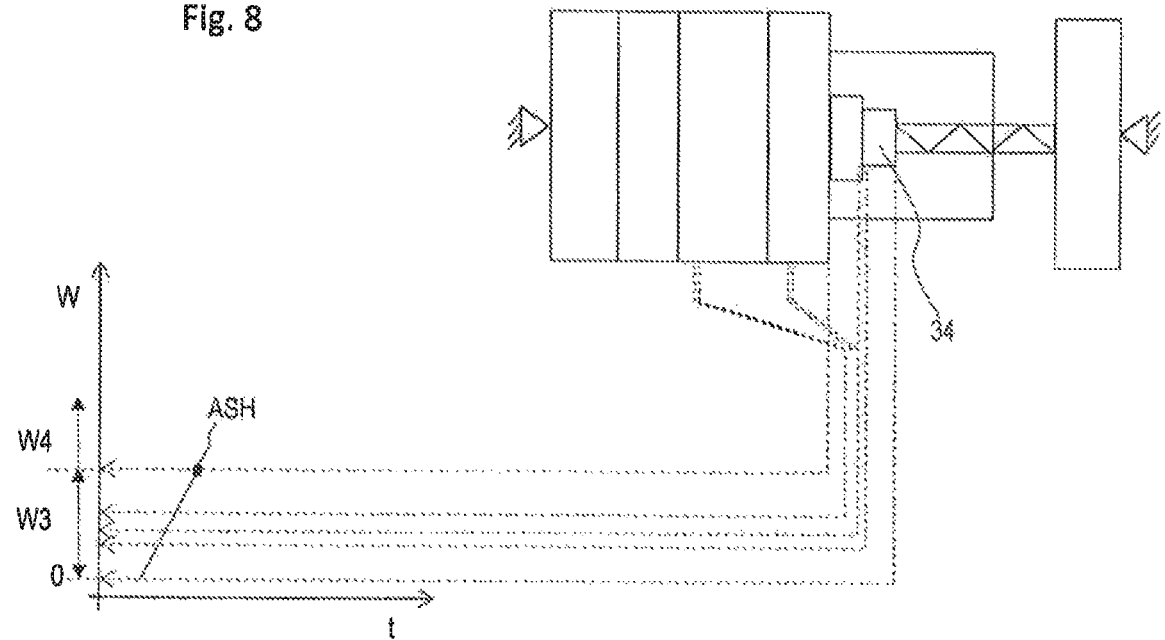

According to FIG. 9, the spindle nut 34 is then moved over a spindle nut path W3 until it comes into abutment with the piston base 28. It generates no brake forces initially in this case, so that the spindle nut path W3 is equivalent to a first movement range of the parking brake unit 30. Any further movement of the spindle nut 34 in the application direction Z leads accordingly to an additional build-up of brake forces, which is reflected in turn in a significant rise in the motor current. In other words, another movement in the application direction Z leads to a movement of the spindle nut 34 into a second movement range W4 of the parking brake unit 30. The position of the spindle nut 34 in FIG. 9 or of the spindle nut path W3 covered is consequently determined as the position of the support point ASH. A comparison with FIG. 4 makes it directly clear that this position of the support point ASH corresponds to a much greater spindle nut path W than in the pressureless variant.

Figure 10:
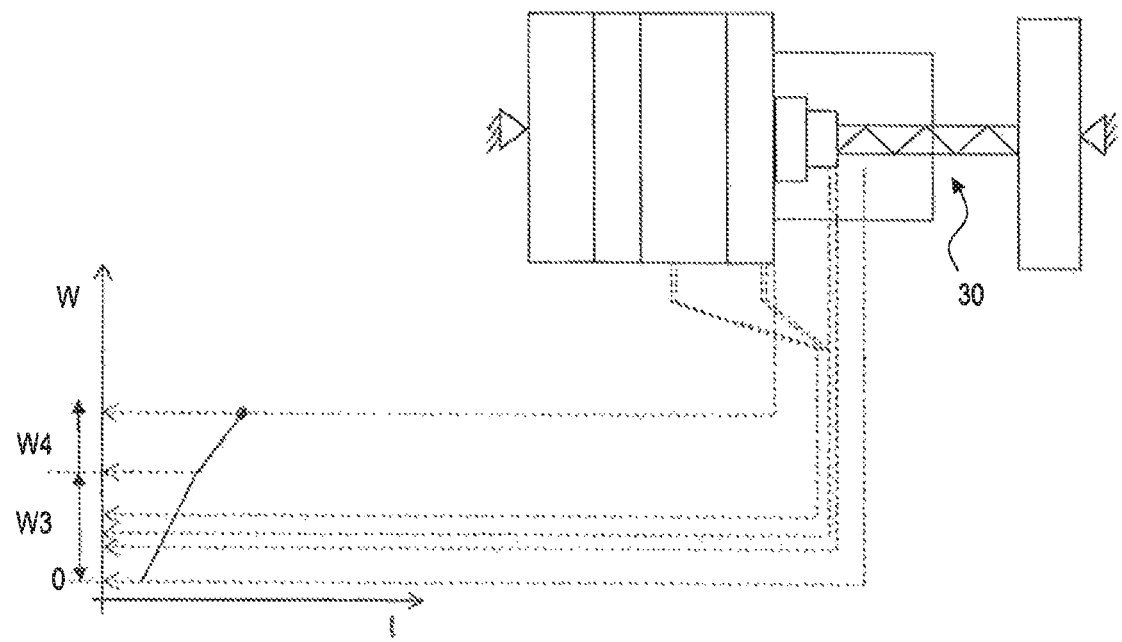
Figure 11:
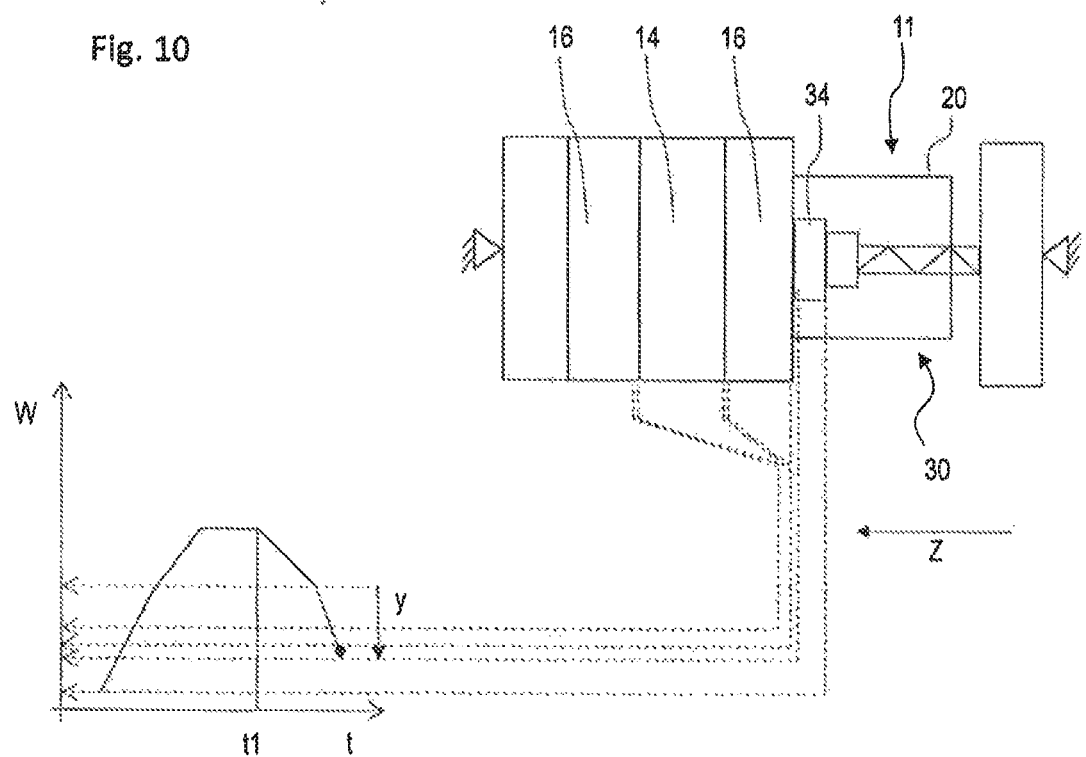

FIG. 10 shows the additional brake force build-up carried out starting out from FIG. 9 by movement of the parking brake unit 30 into the second movement range W4. After holding of this brake force, the release of the parking brake unit 30 is initiated at time t1 according to FIG. 11. To do this the spindle nut 34 is moved by analogy with the pressureless method initially as far as the determined position of the support point ASH and then by a predetermined distance Y starting out from the support point ASH opposite to the application direction Z. Since due to the initial hydraulic pressure build-up the support point ASH was only recognised after a comparatively large spindle nut path W3, however, the return movement of the spindle nut 34 by the distance Y is too small to recreate the original gap dimensions S and in particular the brake clearance L between the friction linings 16 and the brake disc 14 in the desired manner. This applies even after a dissipation of the hydraulic pressure in the service brake 11, as the spindle nut 34 blocks a complete return movement of the actuating piston 20.

In the same sense, the "displaced" position determined of the support point ASH due to the hydraulic pressure would lead to the desired brake forces not being achieved with control instructions based on this for application of the parking brake unit 30. This applies in particular because the initial production of the hydraulic pressure can lead not only to bridging of all gap dimensions, but also to considerable elastic deformations within the vehicle brake 10 and in particular of the brake housing 12. Depending on the hydraulic pressure present, the position of the support point ASH determined by means of the motor current would thus vary. This is especially critical because the hydraulic pressure can itself vary sharply in a stationary state of the vehicle depending on the state of lading and/or inclination of the carriageway, for example if the driver attempts to hold the vehicle stationary on a hill. If determination of the position of the support point ASH takes place in such a comparatively strongly pressurised state of the vehicle brake 10, the aforesaid inaccuracies occur to a correspondingly augmented extent and do not on the whole permit any precise control of the parking brake unit 30, in particular when setting the brake clearance L and the safety distance X. In other words, the determined position of the support point ASH is distorted not only by the initial hydraulic pressure, but also a function of the hydraulic pressure actually present.

In summary, it is evident from the exemplary embodiments that flexible determination of the position of the support point AS facilitates precise control of a parking brake unit 30, and that when determining this position, considerable improvements in accuracy can be achieved if the service brake 11 is kept free of an increased hydraulic pressure (such as is required, for example, to keep the vehicle stationary). In addition, the gap dimension S, X or the safety distance X can be reduced to a value of virtually zero, due to which in the production of brake forces by the parking brake unit independently of the driver, for example in automatic processes of entering and/or exiting parking spaces or in the context of driver assistance systems, the time and response behaviour is significantly improved when building up brake pressure.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A method for operating a vehicle brake comprising the following steps of:
    advancing a parking brake unit from a first movement range where no brake force is generated into a second movement range where a brake force is generated due to an actuating piston and a spindle moving in a first direction;
    detecting a course of an operating parameter of the parking brake unit while moving the parking brake unit from the first movement range to the second movement range; and
    determining a position of a support point by means of the course of the operating parameter;
    wherein the support point is deemed to be the position of the parking brake unit when the brake force is initially generated due to the actuating piston and spindle advancing in the first direction and wherein the operating parameter is at least one of a motor current of an electromotive drive unit or a speed of the electromotive drive unit; and
    wherein the position of the support point is stored as a linear distance between the support point and a reference point wherein the support point is identified via the operating parameter.

2. The method according to claim 1, wherein the parking brake unit advances relative to the reference point and subsequently retracts relative to the position of the support point; and wherein the position of the support point has been stored as the linear distance between the support point and the reference point.

3. The method according to claim 2, wherein the method further comprises the following steps of:
storing the position of the support point in a controller of the vehicle brake; and
using the determined position of the support point to influence a release of the parking brake unit.

4. The method according to claim 3, wherein the release of the parking brake unit includes a retraction of the parking brake unit from the second movement range at least up to the support point where the brake force is reduced to zero.

5. The method according to claim 4, wherein the release of the parking brake unit includes a retraction of the parking brake unit beyond the support point so that the parking brake is in the first movement range.

6. The method according to claim 5, wherein the retraction of the parking brake unit from the second movement range and into the first movement range is determined by a predetermined brake clearance.

7. The method according to claim 5, wherein the retraction of the parking brake unit from the second movement range into the first movement range is determined by a predetermined safety distance between the parking brake unit and the actuating piston.

8. The method according to claim 5, wherein the retraction of the parking brake unit from the second movement range into the first movement range takes place over a retraction distance which is defined as the predetermined distance to the support point.

9. The method according to claim 1, wherein the parking brake unit includes an electromotive drive unit and an actuator unit interacting with the actuating piston, and
wherein the electromotive drive unit is configured to extend the actuator unit over the first movement range and into the second movement range.

10. The method according to claim 9, wherein the actuator unit comprises a nut/spindle arrangement and the position of the support point is defined as a function of at least one of the following parameters:
position information of the spindle nut relative to the reference point;
a path distance of the spindle nut relative to the reference point; or
a number of revolutions of the nut/spindle arrangement.

11. The method according to claim 1, wherein the method further comprises the following step:
further advancing the parking brake unit from another first movement range where no brake force is generated into another second movement range where another brake force is generated due to the actuating piston and the spindle further advancing in the first direction;
monitoring the operating parameter of the parking brake unit while advancing the parking brake unit from the another first movement range to the another second movement range; and
determining an updated position of the support point via the operating parameter;
repeatedly performing the steps of advancing the parking brake from the another first movement range to the another second movement range, monitoring the operating parameter, and determining the updated position of the support point until at least one of the following criteria is met: expiry of a predetermined time interval; attainment of a predetermined driving performance of the vehicle; attainment of a predetermined operating duration of the vehicle; or attainment of a predetermined braking performance of the vehicle.

12. The method according to claim 11, wherein the attainment of the predetermined driving performance of the vehicle is a predetermined distance covered by the vehicle and the attainment of a predetermined braking performance of the vehicle is a predetermined number of braking operations of the vehicle.

13. The method according to claim 1, wherein the method further comprises the following steps:
actuating the parking brake unit so as to generate a brake force independently of a driver by overcoming a brake clearance; and
releasing the parking brake unit via retraction of the nut/spindle to dissipate the brake force;
wherein the step of releasing the parking brake is executed according to the position of the support point.

* * * * *